US006771269B1

(12) United States Patent
Radecki et al.

(10) Patent No.: US 6,771,269 B1
(45) Date of Patent: Aug. 3, 2004

(54) METHOD AND APPARATUS FOR IMPROVING PROCESSING THROUGHPUT IN A VIDEO GRAPHICS SYSTEM

(75) Inventors: Matthew P. Radecki, Oviedo, FL (US); Timothy M. Kelley, Orlando, FL (US); Phillip J. Rogers, Pepperell, MA (US)

(73) Assignee: ATI International SRL, Christchurch (BB)

(*) Notice: Subject to any disclaimer, the term of this patent is extended or adjusted under 35 U.S.C. 154(b) by 372 days.

(21) Appl. No.: 09/759,537

(22) Filed: Jan. 12, 2001

(51) Int. Cl.$^{7}$ .................................................. G06F 15/16
(52) U.S. Cl. ........................................ 345/503; 345/522
(58) Field of Search ................................ 345/503, 522, 345/537, 502, 419, 582, 568, 519, 520, 441, 553, 426, 546, 541, 556, 531, 505; 711/153, 206, 207; 714/52; 710/51, 57; 703/26

(56) References Cited

U.S. PATENT DOCUMENTS 5,917,505 A * 6/1999 Larson ........................ 345/522
6,160,559 A * 12/2000 Omtzigt ....................... 345/503
6,515,670 B1 * 2/2003 Huang et al. ............... 345/503

* cited by examiner

*Primary Examiner*—Matthew C. Bella
*Assistant Examiner*—Dalip Singh
(74) *Attorney, Agent, or Firm*—Vedder, Price, Kaufman & Kammholz, P.C.

(57) ABSTRACT

A video graphics system employs a method and apparatus for improving throughput of the system. The video graphics system includes a graphics driver, a graphics processor, and a memory. Responsive to receiving a drawing command from an application, the graphics driver determines whether the graphics processor can begin executing the drawing command within a desired period of time. When the graphics processor is heavily loaded and cannot begin executing the command within the desired period of time, the graphics driver partially processes stored vertex information associated with the drawing command, and preferably stores the pre-processed vertex information in the memory. The graphics driver then preferably issues a new drawing command relating to the stored pre-processed information and instructing the graphics processor not to perform any of the processing already performed by the graphics driver. The graphics driver is preferably implemented in software and stored on a computer-readable storage medium.

46 Claims, 7 Drawing Sheets

--PRIOR ART--

--PRIOR ART--

METHOD AND APPARATUS FOR IMPROVING PROCESSING THROUGHPUT IN A VIDEO GRAPHICS SYSTEM

FIELD OF THE INVENTION

The invention relates generally to vertex information processing in video graphics systems. More particularly, the present invention relates to a method and apparatus for improving processing throughput in a video graphics system, especially when the vertex information processing load of the system's graphics processing engine is substantial.

BACKGROUND OF THE INVENTION

Video graphics systems are commonly used to display two-dimensional (2D) and three-dimensional (3D) objects on display devices, such as computer monitors and television screens. Such systems receive drawing commands and object configuration information from software applications, such as video games or Internet browser applications, process the commands based on the object configuration information, and provide appropriate signals to the display devices to illuminate pixels on the device screens, thereby displaying the objects. A block diagram for a typical video graphics system 100 is depicted in FIG. 1. The video graphics system 100 includes, inter alia, a host processing unit 101, a peripheral component interconnect (PCI) bus 103, a graphics processor 105, memory 107, 109 and a display device 111. The graphics processor 105 is typically located on a video card 113 together with local memory 109 that is accessed and used regularly by the graphics processor 105.

The PCI bus 103 typically includes appropriate hardware to couple the host processing unit 101 to the system memory 107 and the graphics processor 105, and to couple the graphics processor 105 to the system memory 107. For example, depending on the system configuration, the PCI bus 103 may include a memory and bus controller integrated circuit (IC) and an accelerated graphics port (AGP) bus to facilitate direct memory access (DMA) transfers of data stored in the system memory 107 to the graphics processor 105. The display device 111 is typically a conventional cathode ray tube (CRT) display, liquid crystal display (LCD), or other display. Although not shown for purposes of clarity, other components, such as a video frame buffer, a video signal generator, and other known 3D pipeline components, are commonly incorporated between the graphics processor 105 and the display device 111 to properly display objects rendered by the graphics processor 105.

The host processing unit 101 is typically a central processing unit (CPU) or an equivalent microprocessor-based computer. The host processing unit 101 generally executes several software applications with respect to video graphics processing, including a host application 115, an operating system runtime layer 117, and a graphics driver application 119. These applications 115–119 are typically stored on the hard disk component of the system memory 107, a memory card, a floppy disk, a CD-ROM, or some other computer-readable storage medium. The host application 115 is the application that initiates all drawing commands and provides all information necessary for the other graphics applications and processing components to display objects on the display device 111. For example, the host application 115 might be a word processing application, a video game, a computer game, a spreadsheet application, or any other application that requires two-dimensional or three-dimensional objects to be displayed on a display device 111.

In graphics systems, each object to be displayed is typically divided into one or more graphics primitive groups. Common primitive groups include a point list, a line list, and a triangle list. Each primitive group includes a respective number of vertices. For example, a point list primitive group has one or more vertices making up one or more points, a line primitive group has two or more vertices making up one or more lines, and a triangle primitive has three or more vertices making up one or more triangles. Each vertex has information associated with it to indicate, inter alia, its position in a reference coordinate system and its color. In most applications, such vertex information consists of a vector of multiple parameters to indicate the vertex's position and other optional properties. For example, the vector may include parameters relating to the vertex's normal vector, diffuse color, specular color, other color data, texture coordinates, and fog data. Consequently, the host application 115 not only issues drawing commands, but also provides the vertex information for each vertex of each primitive to be drawn to display each object of a graphics scene.

The operating system runtime layer 117 provides a well-defined application programming interface (API) to the host application 115 and a well-defined device driver interface (DDI) to the graphics driver application 119. That is, the operating system runtime layer 117 is a software layer that enables various host applications 115 to interface smoothly with various graphics driver applications 119. One example of an operating system runtime layer application 117 is the "DIRECTX7" component application of the "WINDOWS" family of operating systems that is commercially available from Microsoft Corporation of Redmond, Wash.

The graphics driver application 119 is the application that provides drawing commands to the graphics processor 105 in a manner understandable by the graphics processor 105. In most circumstances, the graphics driver application 105 and the video card 113 containing the graphics processor 105 are sold as a set to insure proper operation of the graphics rendering portion of the system (i.e., the portion of the graphics system 100 that receives vertex information from the host application 115, processes the vertex information, and generates the appropriate analog signals to illuminate the pixels of the display device 111 as indicated in the vertex information).

During its execution, the host application 115 stores vertex information in either the system memory 107 or the local memory 109 on the video card 113. To store the vertex information, the host application 115 first requests allocation of portions of the respective memory 107, 109 and then stores the vertex information in the allocated portions. The allocated portions of memory 107, 109 are typically referred to as vertex buffers (VBs) 125. In addition, the host application 115 stores transformation matrices in either the system memory 107 or the local memory 109 on the video card 113. The graphics driver application 119 supplies the transformation matrices to the graphics processor 105. The transformation matrices are used by the graphics processor 105 to transform the position vector of each vertex from the reference coordinate system used by the application 115 to construct the primitives of the object to the coordinate system used to construct objects in a viewing frustum of the display device 111.

After the host application 115 stores the vertex information in one or more vertex buffers 125, the host application 115 issues drawing commands to the graphics driver 119 via the runtime layer 117. Each drawing command typically includes an instruction (e.g., "draw"), a memory identification (system memory 107 or video card local memory 109), an address in the identified memory 107, 109 of a vertex buffer 125, and a quantity of vertices in the vertex buffer 125. Upon receiving the commands, the graphics driver 119 processes and reformats the commands into a form executable by the graphics processor 105, and stores the processed/reformatted commands in groups in allocated areas of system memory 107 or video card local memory 109 that are accessible by the graphics processor 105. Such areas of memory 107, 109 are typically referred to as command buffers (CBs) 127. An exemplary command buffer 127 is illustrated in FIG. 2.

The exemplary command buffer 127 includes five drawing commands 201–205, although actual command buffers 127 may include many more commands 201–205. As shown in FIG. 2, each command 201–205 in the buffer 127 preferably includes a draw instruction 207, a memory identifier 209 (system memory 107 or local video card memory 109), a vertex buffer address 211 within the identified memory and a quantity of vertices 213 in the vertex buffer 125. Execution of one or more drawing commands 201–205 is typically required to render a frame of video for display on the display device 111. For example, as illustrated in FIG. 2, execution of drawing commands 201–203 is required to render video frame 1; whereas, execution of drawing commands 204–205 is required to render video frame 2.

After filling a particular command buffer 127 with a group of drawing commands 201–205, the graphics driver 119 dispatches the command buffer 127 by sending a signal to the graphics processor 105 instructing the processor 105 to fetch and process the commands 201–205 in the command buffer 127. Typically, the graphics driver 119 is filling command buffers 127 faster than the graphics processor 105 can process the drawing commands 201–205 in the buffers 127. Consequently, queuing algorithms are typically employed between the graphics driver 119 and the graphics processor 105 to allow the graphics processor 105 to quickly begin processing a new command buffer 127 upon completion of processing a prior buffer 127. After the graphics processor 105 has completed processing a command buffer 127, the graphics processor 105 notifies the graphics driver 119 and the host application 115 by writing a command buffer status indication to a completed command buffer register in a graphics processor-accessible memory component of system memory 107. The notification may be a single bit (e.g., one for processed and zero for pending) or may be multiple bits (e.g., if additional status information is desired). Alternatively, the graphics driver 119 may receive the notification directly from the graphics processor 105 via the PCI bus 103. The graphics processor 105 typically processes the command buffers 127 in the order in which they are dispatched by the graphics driver 119.

In certain circumstances, such as when the vertex information of one or more drawing commands 201–205 in one or more command buffers 127 requires complex lighting processing, the graphics processor's performance slows to the point where the application 115 and/or the graphics driver 119 must stop providing drawing commands until the graphics processor 105 catches up. A typical gauge for determining the speed at which the graphics processor 105 is operating relative to the host processing unit 101 is the number of video frames queued for processing in one or more command buffers 127. A video frame s the displayed frame resulting from the complete processing of one or more drawing commands, which may be contained in one or more command buffers. Once the host processing unit 101 is a threshold number (e.g., two or three) of frames ahead of the graphics processor 105, the host processing unit 101 will stop issuing new drawing commands related to new video frames until the graphics processor 105 catches up (i.e., until the number of queued video frames is below the threshold). For example, the graphics processor 105 may be displaying a first frame (e.g., frame A) and processing the next frame (e.g., frame B). If the video frame threshold is three, the host processing unit 101 can issue drawing commands for the next three video frames (e.g., frames C–E). If the graphics processor 105 is slowed for some reason (e.g., due to complex lighting calculations) and is not finished processing frame B by the time the host processing unit 101 is finished issuing drawing commands for frame E, the host processing unit 101 must wait for the graphics processor 105 to finish processing frame B before it can begin issuing drawing commands for frame F (i.e., the frame after frame E). Such waiting is inefficient and reduces system throughput.

Therefore, a need exists for a method and apparatus for improving processing throughput in video graphics system, wherein the method and apparatus substantially reduce the idle time of the host application and graphics driver particularly during periods of peak processing by the graphics processor.

DETAILED DESCRIPTION OF A PREFERRED EMBODIMENT

Figure 1:
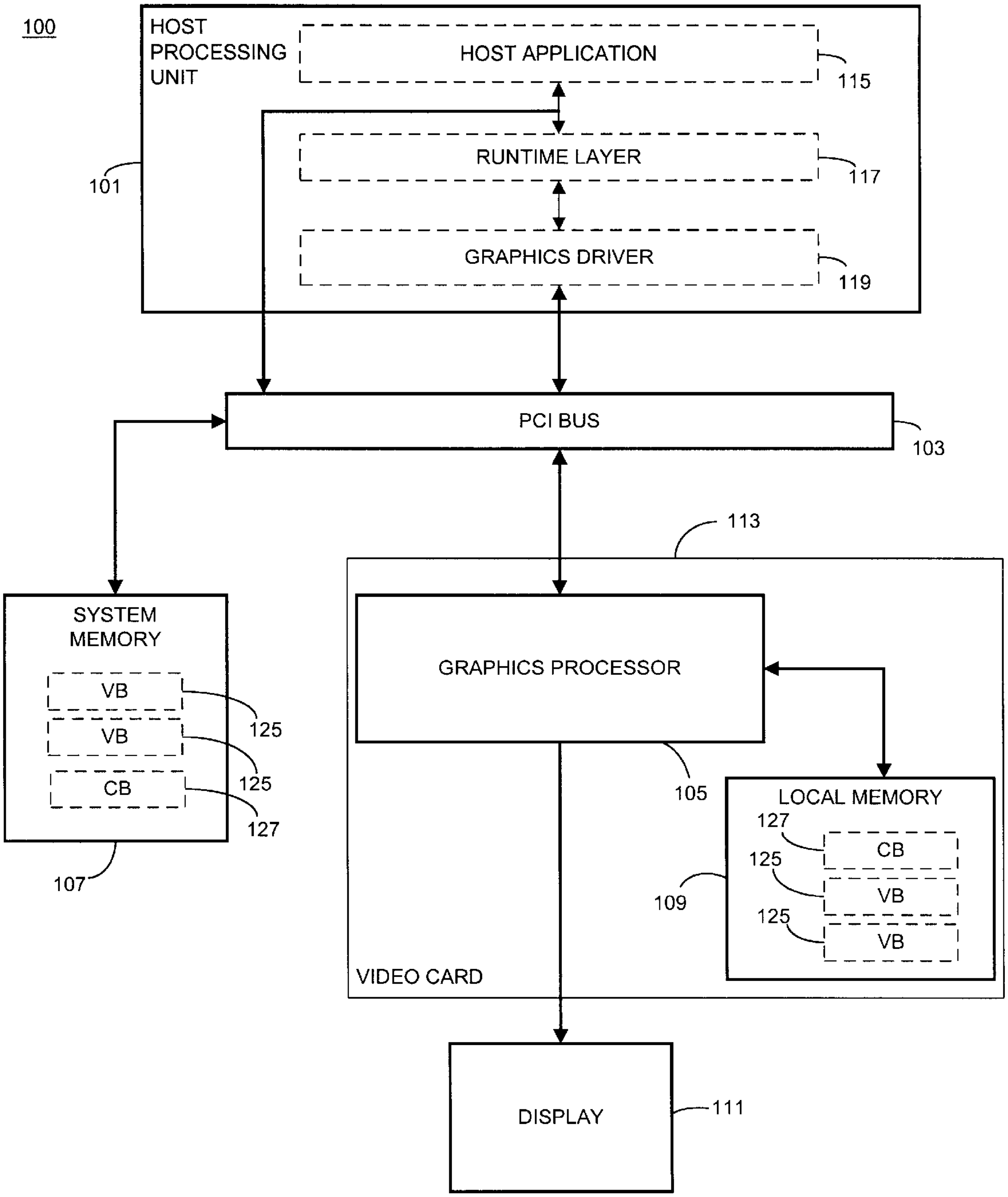
FIG. 1 is a block diagram of a conventional video graphics system that facilitates direct memory access transfers between system memory and a graphics processor.
Figure 2:
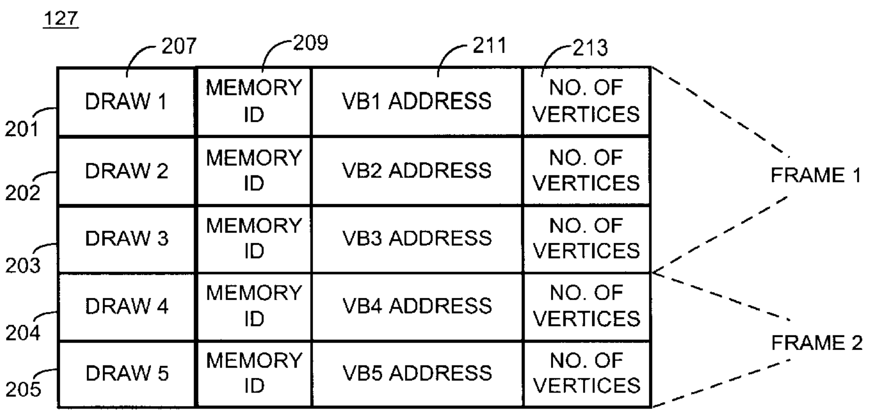
FIG. 2 illustrates typical contents of a command buffer used in the system of FIG. 1.

Generally, the present invention encompasses a method and apparatus for improving throughput of a video graphics system. The video graphics system includes a graphics driver, a graphics processor, and a memory. The graphics driver is operably coupled to an application that issues drawing commands to be processed by the video graphics system. Each drawing command requests display of one or more single-vertexed or multiple-verticed graphics primitives on a display device operably coupled to the graphics processor. Each drawing command includes an address of a location within the memory that includes vertex information for the vertices of the graphics primitives to be displayed. The vertex information is stored in the memory by the application prior to issuance of a drawing command referencing the stored vertex information. Responsive to receiving a drawing command from the application, the graphics driver determines whether the graphics processor can begin executing the drawing command within a desired period of time. When the graphics processor is heavily loaded and cannot begin processing the command within the desired period of time, the graphics driver partially processes the stored vertex information and preferably stores the pre-processed vertex information in the memory. In the event that the graphics driver partially processes the stored vertex information, the graphics driver preferably issues a new drawing command, wherein the new drawing command relates to the pre-processed vertex information and instructs the graphics processor not to perform any of the processing already performed by the graphics driver.

By employing the graphics driver to partially process vertex information associated with one or more drawing commands when the graphics processor is heavily loaded, the present invention improves the throughput of the system by attempting to balance the processing load between the graphics driver (e.g., host processing unit) and the graphics processor. Certain computationally intensive vertex information processing, such as lighting processing, clipping processing, and transformation processing, is well-suited for performance by the graphics driver, particularly when the graphics driver is implemented in software or firmware. Pre-processing of vertex information during peak processing periods of the graphics processor enables the system to maintain a higher average throughput than when no such pre-processing is used as in the prior art because pre-processed vertex information takes less time for the graphics processor to process, and, therefore, enables the graphics processor to more quickly recover from its peak processing period and resume its conventional processing flow in which it performs all the vertex information processing. Prior art systems suffer from throughput delays during peak graphics processor processing periods because the graphics driver simply continues storing commands in command buffers without considering how long it will take for the graphics processor to eventually begin command execution. By contrast, the present invention provides a mechanism for assisting the graphics processor during peak processing periods through use of partial processing to help reduce the graphics processor's processing time while recovering from such peak processing periods.

Figure 3:
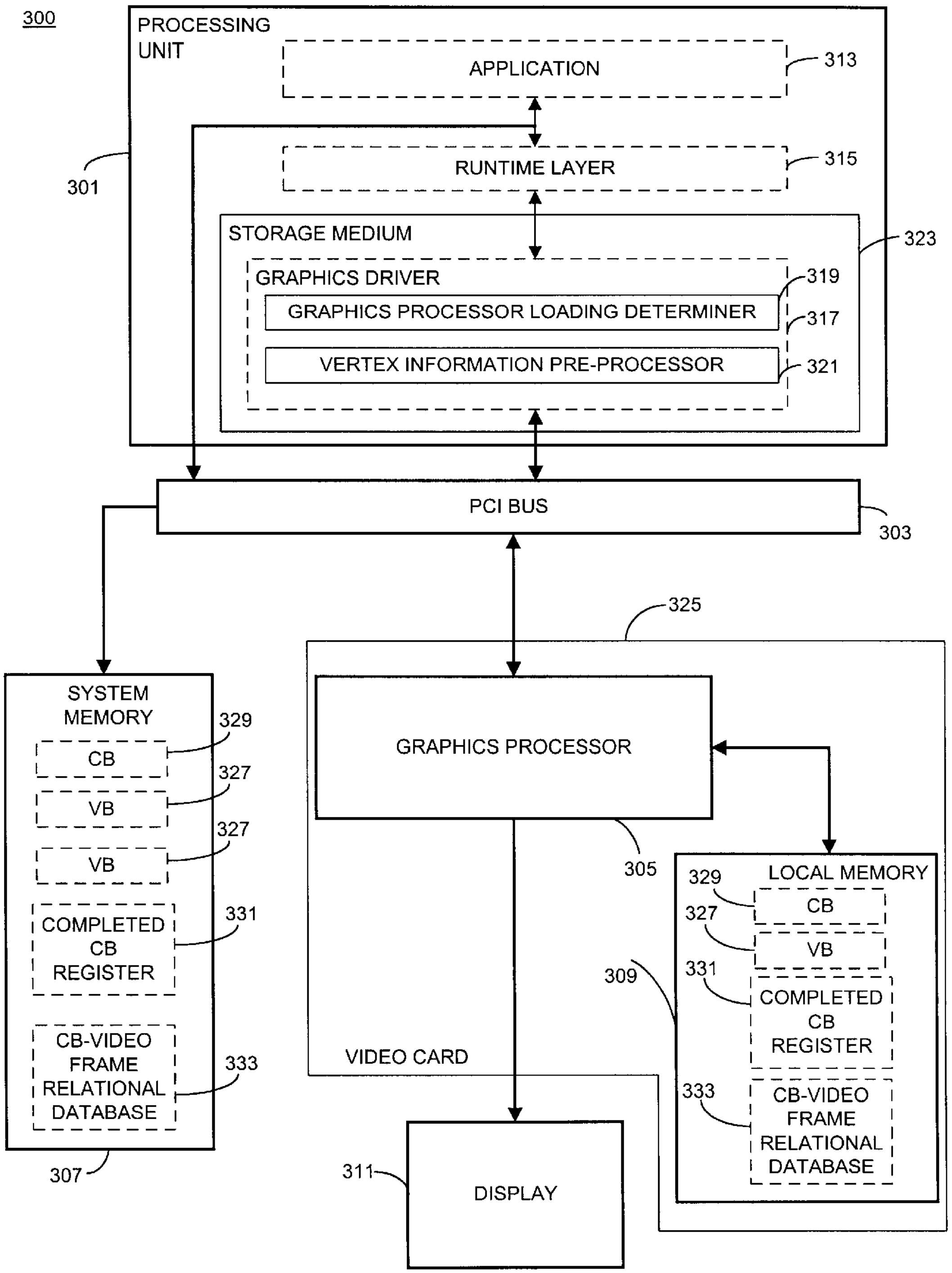
FIG. 3 is a block diagram of a video graphics system in accordance with the present invention.

The present invention can be more fully understood with reference to FIGS. 3–8, in which like reference numerals designate like items. FIG. 3 illustrates a block diagram of a video graphics system 300 in accordance with the present invention. Similar to the video graphics system 100 of FIG. 1, the video graphics system 300 of FIG. 3 includes a processing unit 301, a bus (e.g., a PCI bus 303), a graphics processor 305, system memory 307, local graphics memory 309, and a display 311. The processing unit 301 may be a central processing unit (CPU) or any single or multiple microprocessor-based processing device, any single or multiple microcontroller-based processing device, or any other processing device that executes a software application 313, an operating system runtime software layer 315, and a graphics driver software component 317. For example, the processing unit 301 may be a handheld Internet appliance, a laptop computer, a palmtop computer, a personal computer, a workstation, a personal digital assistant (PDA), a set top box, or any other suitable computing device or devices. In accordance with the present invention, the application 313 may be any software application which requests objects to be displayed on the display 311 and, during operation, stores vertex information (e.g., vertex position, normal and color parameters) in system memory 307 or in video card local memory 309. For example, the application 313 might be a word processing application, a video game, a computer game, a spreadsheet application, or any other application that requires two-dimensional or three-dimensional objects to be displayed on a display device 311. The application 313 initiates all drawing commands and provides all information necessary for the other graphics applications and processing components to display objects on the display device 311.

The operating system runtime software layer 315 may be any conventional runtime operating system component application that provides an API and/or a DDI to other applications, such as the graphics driver 317, which must communicate with the drawing-initiating application 313. One such operating system runtime layer 315 is the "DIRECTX7" operating system component application of the "WINDOWS" family of operating systems that is commercially available from Microsoft Corporation of Redmond, Wash.

The graphics driver 317 is preferably a software application of operating instructions that is stored on a computer readable storage medium 323, such as a compact disc read only memory (CD-ROM), a floppy disk, a digital versatile disk (DVD) or a hard disk, and is sold as a unit with the video card 325. Alternatively, the graphics driver 317 may be a software application stored on a remote hard disk and downloaded into a hard disk component (not shown) of system memory 307 over a wide area network, such as the Internet. Still further, the graphics driver 317 may be any device or combination of devices, whether in hardware, software, or firmware, that allow multiple applications 313 to simultaneously store vertex information in memory 307, 309 and issue drawing commands to a graphics processor 305. When the graphics driver 317 is implemented in software, the processing unit 301 preferably loads the graphics driver 317 into a temporary storage medium 323, such as random access memory (RAM), during execution of the drawing-initiating application 313. In contrast to prior art graphics drivers, the graphics driver 317 of the present invention includes modules 319, 321 that respectively determine the processing load of the graphics processor 305 and pre-process vertex information when the loading of the graphics processor 305 exceeds a threshold (i.e., when the graphics processor 305 will not be able to execute a newly issued drawing command or process a command buffer including such a command within a desired period of time). Operation of the graphics driver 317 in accordance with the present invention is provided in detail below.

The graphics processor 305 is typically located on a video card 323 together with local memory 309 which is accessed and used regularly by the graphics processor 305. The graphics processor 305 is preferably embodied in an application specific integrated circuit (ASIC) and may include a single processing entity or multiple processing entities. Such a processing entity may be a microprocessor, a microcontroller, a digital signal processor (DSP), a state machine, logic circuitry, or any other device that processes information based on operational or programming instructions. One of ordinary skill in the art will recognize that when the graphics processor 305 has one or more of its functions performed by a state machine or logic circuitry, the memory containing the corresponding operational instructions may be embedded within the state machine or logic circuitry.

The PCI bus 303 is well known and typically includes appropriate hardware to couple the processing unit 301 to the system memory 307 and the graphics processor 305, and to couple the graphics processor 305 to the system memory 307. For example, depending on the system configuration, the PCI bus 303 may include a memory and bus controller integrated circuit (IC) and an accelerated graphics port (AGP) bus, which are commercially available from Intel Corporation of Santa Clara, Calif. and Via Technologies, Inc. of Fremont, Calif., to facilitate direct memory access (DMA) transfers of data stored in the system memory 307 to the graphics processor 305. Alternatively, one or more of the graphics processor 305, the processing unit 301 and the PCI bus memory and bus controller may be combined into a single IC. In such an alternative embodiment, an internal bus would be included on the IC to couple the graphics processor 305 to the PCI bus memory and bus controller.

The system memory 307 typically includes at least two memory components, at least one of which is a cacheable and swappable RAM component that is not accessible by the graphics processor 305 and at least another of which is accessible by the graphics processor 305. The graphics processor-accessible memory component of the system memory 307 is preferably a conventional accelerated graphics port (AGP) memory component. The system memory 307 may also include various other forms of memory, such as read only memory (ROM), floppy disks, CD-ROMs, a hard disk drive, a DVD or any other medium for storing digital information. With respect to the present invention, the system memory 307 is used to store vertex information (e.g., in vertex buffers 327 allocated by either the application 313 or the graphics processor 305 as described in detail below) and may be used to store drawing commands (e.g., either individually or in groups in command buffers 329), a completed command buffer register 331 in which the graphics processor 305 stores codes indicating completion of processing of command buffers 329, and a database 333 that relates command buffers to video frames resulting from the processing of command buffers. The completed command buffer register 331 and the database 333 are described in more detail below.

The system memory 307 is also preferably used to store programming and/or operational instructions that, when executed by the processing unit 301, enable the processing unit 301 to perform the functions of the graphics driver 317 and its associated software modules 319, 321, which functions are described in detail below with respect to FIGS. 5–7. As depicted in FIG. 3, the system memory 307 is located external to the video card 323 containing the graphics processor 305.

The video card local memory 309 preferably includes RAM, but may also include ROM or any other medium for storing digital information. With respect to the present invention, the video card local memory 309 may be used to store vertex information (e.g., in vertex buffers 327 allocated by either the application 313 or the graphics processor 305 as described in detail below), drawing commands (e.g., either individually or groups in command buffers 329), the completed command buffer register 331, and/or the command buffer (CB)-video frame relational database 333. The video card local memory 309 is also preferably used to store programming and/or operational instructions that, when executed by the graphics processor 305, enable the graphics processor 305 to perform at least some of the vertex information processing.

The display device 311 may be any conventional cathode ray tube (CRT) display, liquid crystal display (LCD), or other display. Although not shown for purposes of clarity, other components, such as a video frame buffer, a video signal generator, and other known 3D pipeline components, are preferably incorporated between the graphics processor 305 and the display device 311 to properly display primitives rendered by the graphics processor 305.

Operation of the video graphics system 300 occurs substantially as follows in accordance with a preferred embodiment of the present invention. Prior to issuing a drawing command to display a particular object or group of graphics primitives, the application 313 stores vertex information (e.g., vertex position, vertex normal, color, and other attribute parameters) in a vertex buffer 327 for each vertex 408–418 of each graphics primitive. The vertex buffer 327 may be stored in the system memory 307 or in the video card local memory 309.

Some time after filling a particular vertex buffer 327, the application 313 sends a drawing command relating to the filled vertex buffer 327 to the graphics driver 317 via the runtime layer 315. As described above, the drawing command typically includes an instruction (e.g., "draw"), an identification of the memory 307, 309 containing the vertex buffer 327, an address of the vertex buffer 327 in the identified memory 307, 309, and a quantity of vertices for which vertex information is stored in the vertex buffer 327. Upon receiving the drawing command from the application 313, the graphics driver 317 (and in particular, the graphics processor loading determining module 319) determines whether the graphics processor 305 will likely be able to begin executing the drawing command and processing the vertex information within a desired period of time. That is, the graphics driver 317 estimates the present loading of the graphics processor 305.

In a preferred embodiment, such a determination is made by evaluating a quantity of video frames remaining to be processed based on a quantity of unprocessed commands or command buffers, and comparing the quantity of unprocessed video frames to a video frame threshold. As discussed above, a video frame may be rendered for display by the graphics processor 305 by processing vertex information in accordance with one or more (typically more than one) drawing commands. After or as the graphics driver 317 stores drawing commands in command buffers 329, the graphics driver 317 also preferably stores relationships between the command buffers and the video frames resulting from execution of the drawing commands in the command buffers 329 in the command buffer-video frame relational database 333 located in either the system memory 307 or the video card local memory 309. After a command buffer 329 has been processed by the graphics processor 305, the graphics processor 305 preferably stores a completed command buffer code in the completed command buffer register 331 located in either the system memory 307 or the video card local memory 309. The completed command buffer register 331 and the command buffer-video frame relational database 333 may be at fixed addresses in the memory 307, 309, or a memory manager (not shown) in either the runtime layer 315 or the graphics driver 317 may allocate the addresses and memory locations of the register 331 and/or the relational database 333 at the request of the graphics processor 305. If the memory manager is in the runtime layer 315, the runtime layer 315 notifies the graphics driver 317 (e.g., graphics processor loading determiner module 319) of the memory locations and addresses of the completed command buffer register 331 and the command buffer-video frame relational database 333.

The code stored in the completed command buffer register 331 identifies the most recently executed command buffer 329 processed by the graphics processor 305. Thus, the graphics driver 317 determines the quantity of video frames remaining to be processed by examining the command buffer-video frame relational database 333 to determine which video frame corresponds to the most recently executed command buffer 329 and, based on such video frame, how many more video frames are awaiting processing by the graphics processor 305. After determining the quantity of video frames remaining to be processed, the graphics driver 317 compares the quantity to a threshold and, if the quantity is greater than the threshold (or greater than or equal to the threshold depending on the threshold selection), determines that the graphics processor 305 cannot begin executing the newly received command within the desired period of time. The threshold is preferably selected based on the average number of graphics processor processing cycles required to process the command buffers corresponding to a video frame and the average number of graphics driver processing cycles required to fill a sufficient number of command buffers to render a video frame and issue corresponding fetch command instructions. The threshold is preferably established at a level at which the graphics processor 305 will remain busy, but the graphics driver 317 and the application 313 will not become idle.

The graphics driver 317 may vary the video frame threshold over time based on whether the graphics processor 305 appears to be, or not be, reducing or otherwise changing the difference between the quantity of queued video frames and the original video frame threshold. That is, the graphics driver 317 may vary the video frame threshold over time based on whether the graphics processor 305 appears to be catching up to the graphics driver 317.

For example, if the graphics driver 317 detects that, after partially processing vertex information for one or more vertex buffers as described in detail below, the quantity of queued video frames is still greater than the threshold, but the difference between the quantity of queued video frames and the threshold has decreased (i.e., the graphics processor 305 appears to be catching up to the graphics driver 317), the threshold may be increased slowly to take into account the processing speed improvement occurring in the graphics processor 305. Alternatively, if the graphics driver 317 detects that, after partially processing vertex information for one or more vertex buffers as described in detail below, the quantity of queued video frames is still greater than the threshold, and the difference between the quantity of queued video frames and the threshold has increased (i.e., the graphics processor 305 appears to be falling further behind the graphics driver 317), the threshold may be decreased slowly to take into account the processing speed degradation occurring in the graphics processor 305. The modified threshold may be returned to its original value if the graphics driver 317 detects that the processing speed of the graphics processor 305 has degraded (when the modified threshold is greater than the original threshold) or improved (when the modified threshold is less than the original threshold). One of ordinary skill in the art will appreciate that upper and lower bounds should preferably be set when employing a variable threshold as described above to prevent pre-processing to occur too soon (when the modified threshold is small (e.g., one)), possibly resulting in idleness of the graphics processor 305, and/or to enable pre-processing to occur often enough to provide improved processing efficiency (when the modified threshold is large).

In an alternative embodiment, the graphics driver 317 may estimate the quantity of graphics processor processing cycles required to execute the drawing commands or process the command buffers in the outstanding video frames and compare the estimated number of processing cycles to a processing cycle threshold. In this case, the desired period of time corresponds to the predetermined or threshold number of graphics processor processing cycles.

In yet another embodiment, the graphics driver 317 may determine the graphics processor loading by determining a number of command buffers 329 still remaining to be processed by the graphics processor 305. If the quantity of command buffers 329 exceeds a threshold (or is greater than or equal to a threshold depending on the selection of the threshold), the graphics driver 317 determines that the graphics processor 305 will not be able to execute the newly received drawing command within the desired period of time. The graphics driver 317 may vary the command buffer threshold over time based on whether the graphics processor 305 appears to be, or not be, catching up to the graphics driver 317 similar to the variation of the video frame threshold described above.

The graphics driver 317 preferably determines the quantity of command buffers 329 remaining to be processed by reading the completed command buffer code from the completed command buffer register 331 stored in either the system memory 307 or the video card local memory 309. As discussed above, the completed command buffer register 331 may be at a fixed address in the memory 307, 309 or a memory manager (not shown) in either the runtime layer 315 or the graphics driver 317 may allocate the address and memory location of the register 331 at the request of the graphics processor 305. If the memory manager is in the runtime layer 315, the runtime layer 315 notifies the graphics driver 317 (e.g., graphics processor loading determiner module 319) of the memory location and address of the completed command buffer register 331. The code stored in the completed command buffer register 331 identifies the most recently executed command buffer 329 processed by the graphics processor 305. The graphics driver 317 maintains a record of the quantity of command buffers 329 the graphics driver 317 has instructed the graphics processor to fetch and process. Thus, the graphics driver 317 determines the quantity of command buffers 329 remaining to be processed by subtracting the quantity of command buffers 329 it authorized to be fetched from the identity of the most recently executed command buffer 329. For example, if the graphics driver 317 authorized fifty command buffers 329 to be fetched and processed by the graphics processor 305 and the completed command buffer register 331 indicates that the most recently executed command buffer 329 was command buffer number ten, then the graphics driver 317 determines that there are forty command buffers 329 remaining to be processed.

After determining the quantity of command buffers 329 remaining to be processed, the graphics driver 317 in this alternative embodiment compares the quantity to a threshold and, if the quantity is greater than the threshold (or greater than or equal to the threshold depending on the threshold selection), determines that the graphics processor 305 cannot begin executing the newly received command within the desired period of time. The threshold is preferably selected based on the average number of graphics processor processing cycles required to process each command buffer 329 and the average number of graphics driver processing cycles to fill each command buffer and issue a corresponding fetch instruction. The threshold is preferably established at the level at which the graphics processor 305 will remain busy, but the graphics driver 317 and the application 313 will not become idle.

In yet a further embodiment of the present invention, the graphics driver 317 might estimate the graphics processor loading by comparing a quantity of unexecuted commands, instead of a quantity of unprocessed command buffers 329 or video frames, to a threshold to determine whether the graphics processor 305 can likely begin executing the newly received command within the desired period of time. In this embodiment, similar to the command buffer evaluation embodiment described above, the graphics driver 317 might read a completed command code from a completed command register (not shown) to determine the identity of the most recently executed command, and compare the identity of the most recently executed command to the quantity of commands that the graphics driver 317 instructed the graphics processor 305 to fetch and execute to determine a quantity of outstanding commands to be executed.

In another embodiment, the graphics driver 317 may determine whether the graphics processor 305 will be able to begin executing the newly received drawing command within the desired period of time by approximating or estimating the number of graphics processor processing cycles required to execute or process a quantity of outstanding command buffers 329 or a quantity of outstanding commands, and comparing the estimated number of processing cycles to a processing cycle threshold. In this case, the desired period of time corresponds to the predetermined or threshold number of graphics processor processing cycles.

Thus, there are a variety of options contemplated in accordance with the present invention by which the graphics driver 317 can determine whether or not the graphics processor 305 will likely be able to execute the newly received command within a desired period of time that will not require the graphics processor 317 and/or the application 313 to become idle. One of ordinary skill in the art will appreciate that other, non-articulated techniques may be alternatively used to estimate the graphics processor loading and, thereby, determine whether or not the graphics processor will likely be able to execute the newly received drawing command within the desired period of time. Such techniques are intended to fall within the spirit and scope of the present invention and the appended claims.

In the event that the graphics driver 317 determines that the graphics processor 305 cannot begin executing the newly received drawing command within the desired period of time, the graphics driver 317 preferably begins processing the vertex information related to the command. That is, the graphics driver 317 (and in particular, the vertex information pre-processor module 321) preferably begins performing one or more of lighting operations, clipping operations, vertex position transformation operations, texture coordinate transformation operations, texture coordinate generation operations, or any other processing that primarily includes complex mathematical computations involving the stored vertex parameters. While processing the vertex information, the graphics driver 317 preferably periodically or intermittently re-determines whether or not the graphics processor 305 can begin executing the newly received drawing command within the desired period of time using one or more of the aforementioned determination techniques. That is, the graphics processor 317 preferably evaluates whether the loading of the graphics processor 305 has changed since pre-processing began. In the preferred embodiment, the graphics driver 317 re-determines the graphics processor's processing load by comparing the quantity of outstanding, unprocessed video frames to a threshold.

If the graphics driver 317 determines that the graphics processor 305 can begin executing the drawing command within the desired period of time, the graphics driver 317 preferably aborts its processing and provides the drawing command to the graphics processor 305 (e.g., preferably stores the drawing command in a command buffer 329). Alternatively, the graphics driver 317 may store the portion of the vertex information it has pre-processed (e.g., such that the vertex buffer 327 includes both pre-processed and unprocessed vertex information) and issue two new drawing commands to the graphics processor 305—one drawing command referencing the portion of the vertex buffer 327 containing the pre-processed vertex information and instructing the graphics processor 305 not to perform the processing already performed by the graphics driver 317, and the other drawing command referencing the portion of the vertex buffer 327 containing the unprocessed vertex information.

If the graphics driver 317 completes partially processing the vertex information (e.g., completes performing lighting operations on the vertex normal parameters) before determining that the graphics processor 305 can begin executing the command within the desired period of time, the graphics processor 317 stores the pre-processed vertex information in a vertex buffer 327 (which may require the graphics driver 317 to request the memory manager (not shown) to allocate additional memory to accommodate additional data resulting from pre-processing), creates a new drawing command referencing the vertex buffer 327 containing the pre-processed vertex information and instructing the graphics processor 305 not to perform the processing already performed by the graphics driver 317, and provides the new drawing command to the graphics processor 305 (preferably by storing the drawing command in a command buffer 329 and issuing a fetch command to the graphics processor 305).

In the event that the graphics driver 317 originally determines that the graphics processor 305 can begin executing the newly received drawing command within the desired period of time, the graphics driver 317 provides the drawing command to the graphics processor 305 preferably by storing the drawing command in a command buffer 329 and issuing a fetch command to the graphics processor 305. If the drawing command is provided to the graphics processor 305 and the vertex buffer 327 referenced in the drawing command is located in a graphics processor-inaccessible memory component of the system memory 307, the graphics driver 317 may create a temporary vertex buffer (not shown) in a graphics processor-accessible component of the system memory 307 or in the video card local memory 309, as described in detail in co-pending, commonly assigned U.S. patent application Ser. No. 09/716,735, entitled "Method and Apparatus for Efficiently Processing Vertex Information in a Video Graphics System" and filed on Nov. 20, 2000. The graphic driver's creation of such a temporary vertex buffer enables the graphics processor 305 to more expediently and efficiently process the vertex information than if the graphics driver 317 had merely included the vertex information as part of the drawing command stored in the command buffer 331.

Although the determination of the graphics processor loading was described above as being on a command-by-command basis, one of ordinary skill in the art will appreciate that the loading analysis may not need to be done for every drawing command received by the graphics driver 317. For example, if the graphics driver 317 determines that the quantity of video frames (or some other determinable graphics processor loading parameter, such as command buffers 329, commands, graphics processor processing cycles, or so forth) remaining to be processed is well below a threshold, the graphics driver 317 may be programmed to store the difference or delta between the threshold and the quantity of such unprocessed video frames (or other determinable graphics processor loading parameter), and not perform the loading analysis again until a quantity of commands or command buffers 329 corresponding to a number of video frames equal to the difference or some proportion thereof have been filled by the graphics driver 317, thereby limiting the graphics driver 317 processing cycles required to perform the system load balancing analysis.

Figure 4:
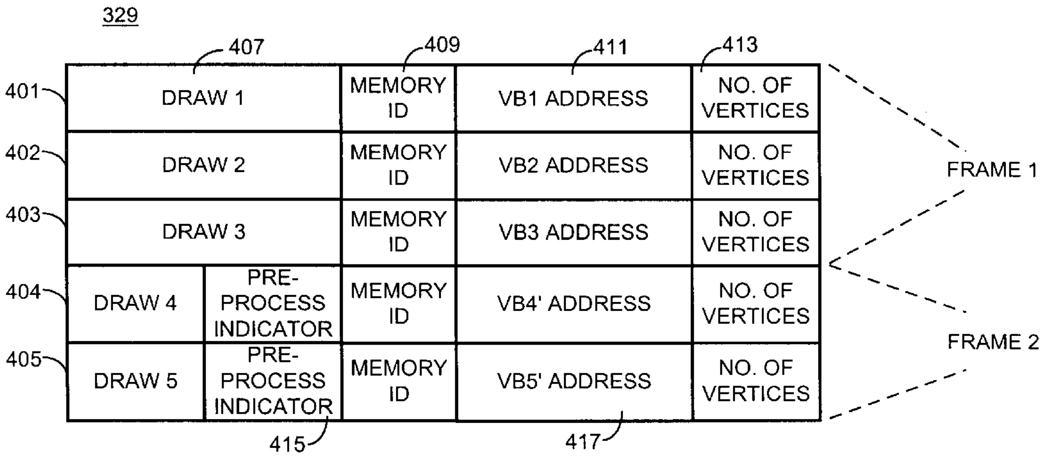
FIG. 4 illustrates contents of an exemplary command buffer after at least some vertex information has been pre-processed by the graphics driver in accordance with the present invention.

FIG. 4 illustrates contents of an exemplary command buffer 329 after at least some vertex information has been pre-processed by the graphics driver 317 in accordance with the present invention. As shown, the command buffer 329 includes a group of drawing commands 401–405. Drawing commands 401–403 are drawing commands as originally issued by the application 313 and drawing commands 404 and 405 are drawing commands created by the graphics driver 317 subsequent to partially processing vertex information referenced in original drawing commands. As in the prior art, each drawing command 401–405 includes a draw instruction 407, a memory identifier 409 (system memory 307 or local video card memory 309), a vertex buffer address 411 within the identified memory and a quantity of vertices 413 in the vertex buffer 327. However, in contrast to the prior art, the drawing commands 404, 405 created by the graphics driver 317 after partially processing vertex information preferably further include a pre-processing indicator 415 to inform the graphics processor 305 as to what processing has already been performed by the graphics driver 317 and to instruct the graphics processor 305 not to perform the processing already performed by the graphics driver 317. In addition, the vertex buffer addresses 417 (VB4' and VB5') of the graphics driver-created commands 404, 405 refer to vertex buffers 327 that include partially processed vertex information, in contrast the vertex buffer addresses 411 of the other drawing commands 401–403, which refer to unprocessed vertex information (VB1, VB2, and VB3).

As described above, the present invention provides a video graphics system 300 in which vertex information processing load is distributed between the graphics driver 317 and the graphics processor 305 during time periods when the graphics processor 305 is heavily loaded. When the graphics driver 317 detects a heavy loading condition on the graphics processor 305, it pre-processes vertex information instead of sitting idle in an attempt to help the system 300 more expediently recover from any delays incurred due to the processing peak of the graphics processor 305. Pre-processing of the vertex information reduces the processing requirements of the graphics processor 305, which allows the graphics processor 305 to more quickly complete vertex information processing and more expediently complete the processing of pending drawing commands and command buffers. However, through its criteria for initiating pre-processing and its regular check of graphics processor loading during pre-processing, the present invention attempts to prevent the graphics processor 305 from ever sitting idle and awaiting pre-processing by the graphics driver 317. Rather, the present invention attempts to keep the graphics processor 305 continually processing and the graphics driver 317 only occasionally pre-processing when the load on the graphics processor 305 is such that the graphics driver 317 and/or the application 313 would otherwise become idle as in the prior art.

Figure 5:
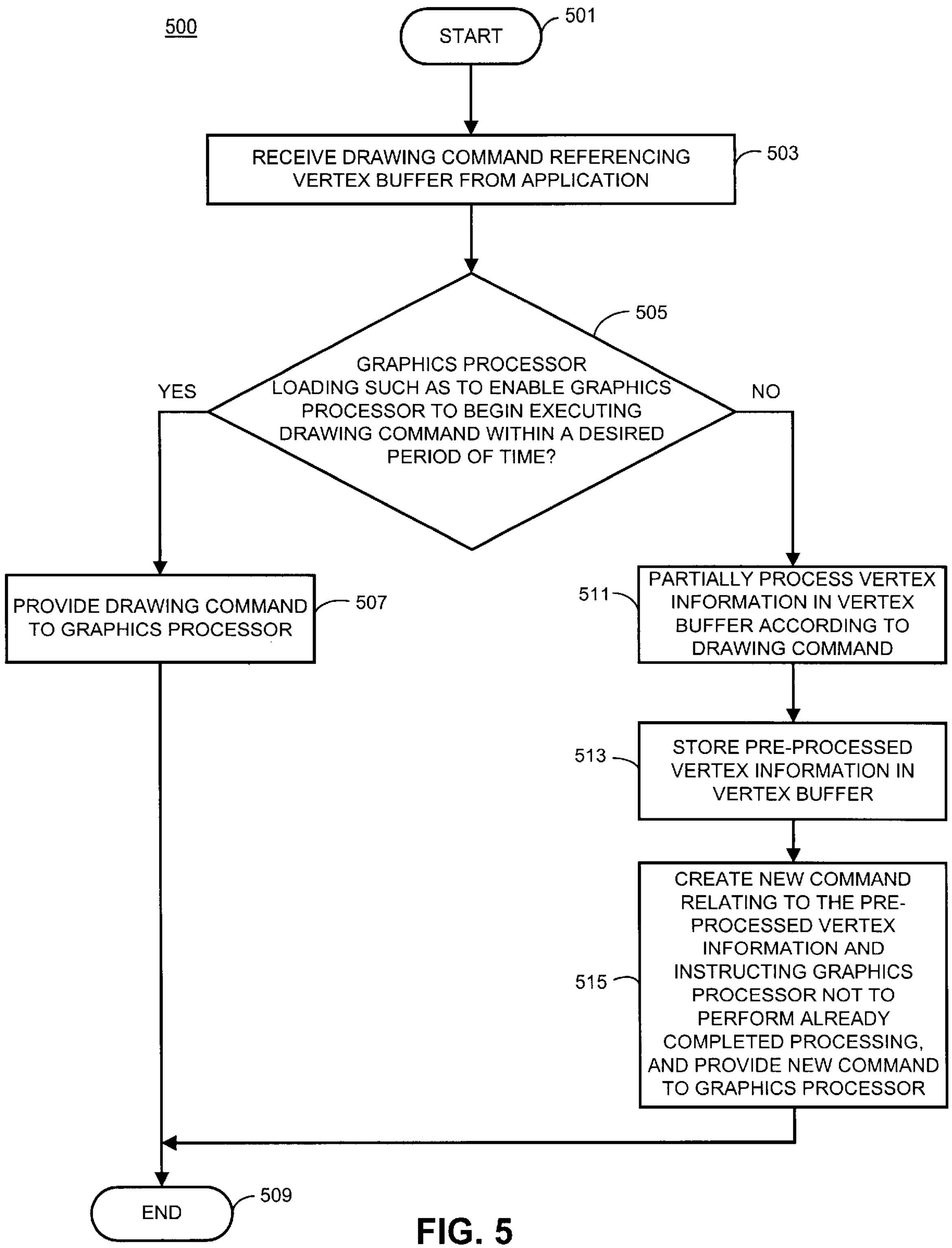
FIG. 5 is a logic flow diagram of steps executed by a graphics driver to improve throughput of a video graphics system in accordance with the present invention.

FIG. 5 is a logic flow diagram 500 of steps executed by a graphics driver to improve throughput of a video graphics system in accordance with the present invention. As discussed above, the graphics driver is preferably implemented as a software algorithm stored on a computer-readable storage medium, such as any form of RAM, any form of read only memory (ROM) (including, without limitation, programmable ROM (PROM) and CD-ROM), any form of magnetic storage media (including, without limitation, a floppy disk or a magnetic tape), a digital versatile disk (DVD), any combination of the foregoing types of media, such as a hard drive, or any other device that stores digital information. The logic flow begins (501) when the graphics driver receives (503) a drawing command from an application, wherein the drawing command references a vertex buffer. Responsive to receiving the drawing command, the graphics driver determines (505) whether the graphics processor loading is such as to enable the graphics processor to begin executing the drawing command within a desired period of time (e.g., within a predetermined number of graphics processor processing cycles). In the event that the graphics driver determines that the graphics processor is likely to begin processing the drawing command within the desired period of time, the graphics driver provides (507) the drawing command to the graphics processor (e.g., by storing the command in a command buffer) and the logic flow ends (509).

On the other hand, in the event that the graphics driver determines (505) that the graphics processor is not likely to begin processing the drawing command within the desired period of time, the graphics driver partially processes (511) the vertex information according to the command and stores (513) the pre-processed vertex information in the vertex buffer it was originally stored in or in another vertex buffer (e.g., when additional memory is need to accommodate the pre-processed data). The graphics driver then creates (515) a new drawing command related to the pre-processed vertex information and referencing the vertex buffer in which the pre-processed vertex information is stored, and provides (515) the new drawing command to the graphics processor (e.g., by storing the command in a command buffer), thereby ending (509) the logic flow. The new drawing command also preferably instructs the graphics processor not to perform any processing already performed by the graphics driver, thereby preventing any duplicative processing and/or processing errors (e.g., due to the graphics processor performing duplicative processing on already processed vertex parameters).

Figure 6:
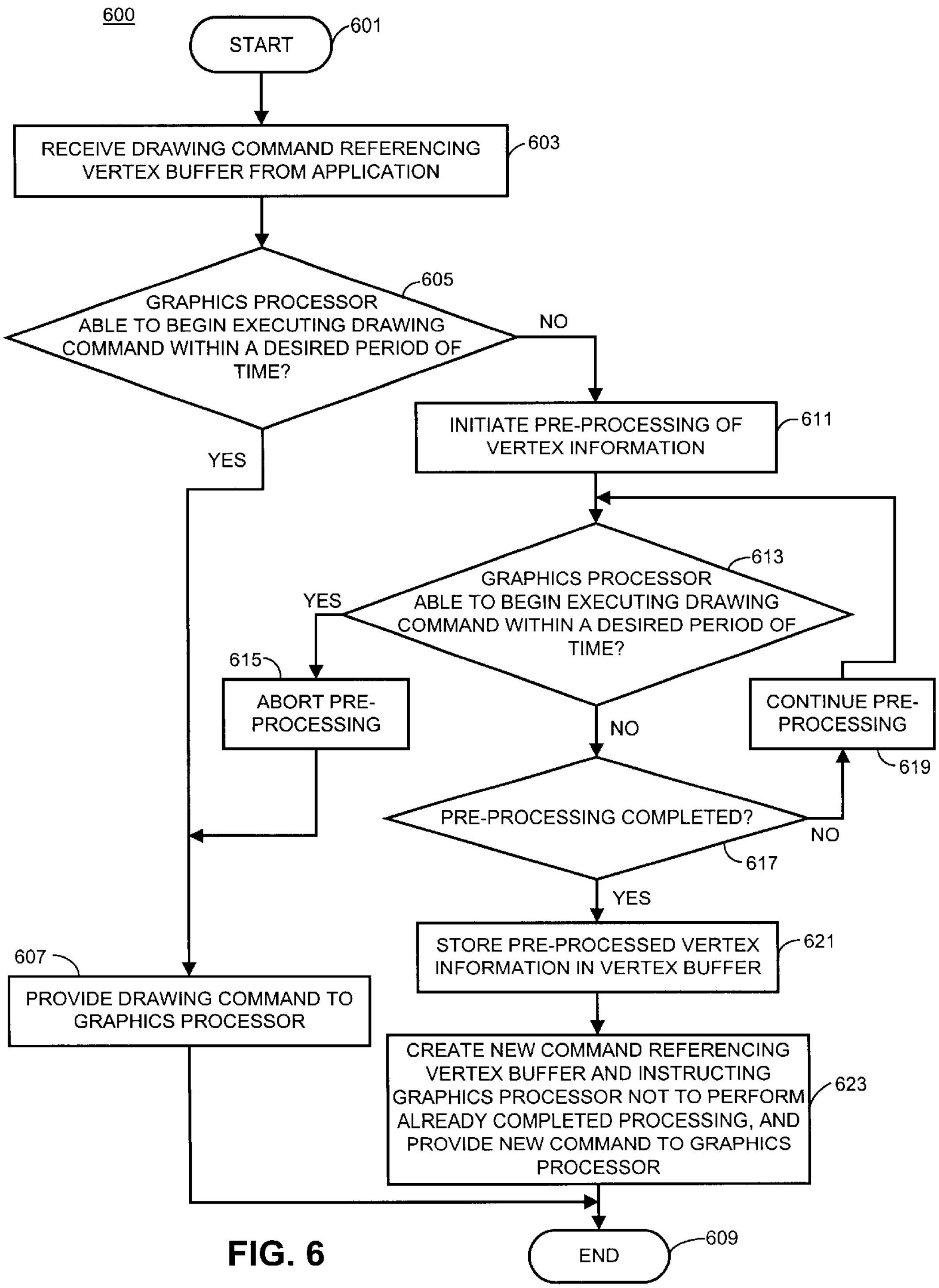
FIG. 6 is a logic flow diagram of steps executed by a graphics driver to improve throughput of a video graphics system in accordance with a preferred embodiment of the present invention.

FIG. 6 is a logic flow diagram 600 of steps executed by a graphics driver to improve throughput of a video graphics system in accordance with a preferred embodiment of the present invention. The logic flow begins (601) when the graphics driver receives (603) a drawing command referencing a vertex buffer from an application and determines (605) whether the graphics processor will likely be able to begin executing the command or a command buffer containing the command within a desired period of time. As discussed above and in more detail below with respect to FIG. 7, such a determination is preferably performed by comparing a remaining quantity of unprocessed video frames to a threshold. In the event that the graphics driver determines that the graphics processor can begin executing the command or a command buffer containing the command within the desired period of time, the graphics driver provides (607) the command to the graphics processor and the logic flow ends (609).

However, in the event that the graphics driver determines (605) that the graphics processor is not likely to be able to begin executing the command or a command buffer containing the command within the desired period of time, the graphics driver initiates (611) partial processing (e.g., one or more of lighting processing, vertex position transformation processing, and clipping processing) of the vertex information related to the command. While performing the partial processing, the graphics driver periodically re-determines (613) whether the graphics processor is likely to be able to begin executing the drawing command within the desired period of time. This determination is similar to the determination of step 605, except that a different threshold may be used depending on the amount of vertex information pre-processing that has been completed. For example, to originally determine (605) whether the graphics processor is able to begin executing the drawing command within the desired period of time, the graphics driver may compare the quantity of unprocessed video frames to a first threshold based on the average number of graphics processor processing cycles required to process the commands or command buffers corresponding to a video frame. By contrast, to re-determine (613) whether the graphics processor is able to begin executing the drawing command within the desired period of time, the graphics driver may compare the quantity of unprocessed video frames to a second threshold, where the second threshold is preferably less than the first threshold because the graphics processor may have processed some of the queued video frames. In the preferred embodiment, the unprocessed video frame thresholds used at steps 605 and 613 are the same.

If, during a periodic re-determination of graphics processor loading, the graphics driver determines that the graphics processor is likely to be able to begin executing the drawing command within the desired period of time, the graphics driver preferably aborts (615) pre-processing and provides (607) the drawing command to the graphics processor. If, on the other hand, the graphics driver still determines that the graphics processor is not likely to be able to begin executing the drawing command within the desired period of time, the graphics driver determines (617) whether pre-processing has been completed. If pre-processing has not been completed, the graphics driver continues (619) pre-processing and the logic flow returns to step 613. If pre-processing has been completed without a determination that the graphics processor is likely able to begin executing the drawing command within the desired period of time, the graphics driver stores (621) the pre-processed vertex information in a vertex buffer and creates (623) a new drawing command relating to the pre-processed vertex information and referencing the vertex buffer containing the pre-processed vertex information. The new drawing command created by the graphics driver also preferably instructs the graphics processor not to perform any of the processing already performed by the graphics driver. The graphics driver provides (623) the new drawing command to the graphics processor (preferably by storing the command in a command buffer) and the logic flow ends (609).

Figure 7:
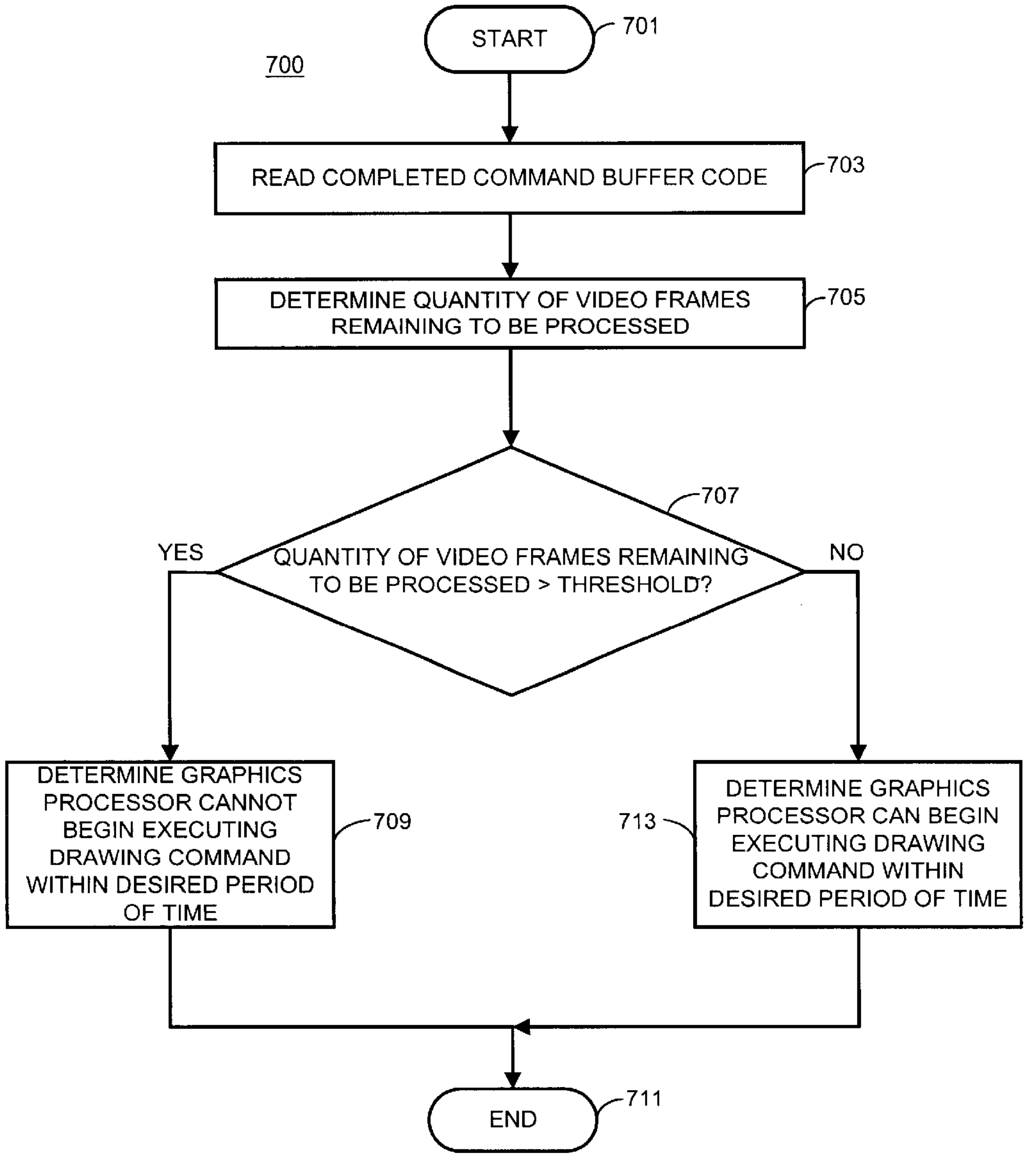
FIG. 7 is a logic flow diagram of steps executed by a graphics driver to determine whether a graphics processor can begin executing a drawing command received from an application within a desired period of time in accordance with a preferred embodiment of the present invention.

FIG. 7 is a logic flow diagram 700 of steps executed by a graphics driver to determine whether a graphics processor can begin executing a drawing command received from an application within a desired period of time in accordance with a preferred embodiment of the present invention. The steps 701–713 of the logic flow diagram 700 are preferably used to implement the determinations of steps 605 and 613 of FIG. 6, except that, as described above, the threshold number of video frames may be different for each determination. The logic flow begins (701) when the graphics driver reads (703) a completed command buffer code stored in memory (e.g., in a completed command buffer register) by the graphics processor. The completed command buffer code indicates which command buffer or group of drawing commands was most recently processed by the graphics processor.

Based on which command buffer was most recently processed by the graphics processor, the graphics driver determines (705) the quantity of video frames remaining to be processed and compares (707) the quantity to a threshold. To determine the quantity of video frames remaining to be processed, the graphics driver preferably evaluates a database relating the command buffers to the video frames. The database is preferably updated by the graphics driver as each command buffer is filled with drawing commands. Thus, based on the most recently processed command buffer, the graphics driver can determine which video frame was most recently processed and, from the database, the quantity of remaining unprocessed video frames.

If the quantity of video frames remaining to be processed is greater than or equal to the threshold (or only greater than the threshold depending the selection of the threshold), the graphics driver determines (709) that the graphics processor cannot begin executing the drawing command within the desired period of time, and the logic flow ends (711). On the other hand, if the quantity of video frames remaining to be processed is less than the threshold (or less than or equal to the threshold depending the selection of the threshold), the graphics driver determines (713) that the graphics processor can begin executing the drawing command within the desired period of time, and the logic flow ends (711).

Figure 8:
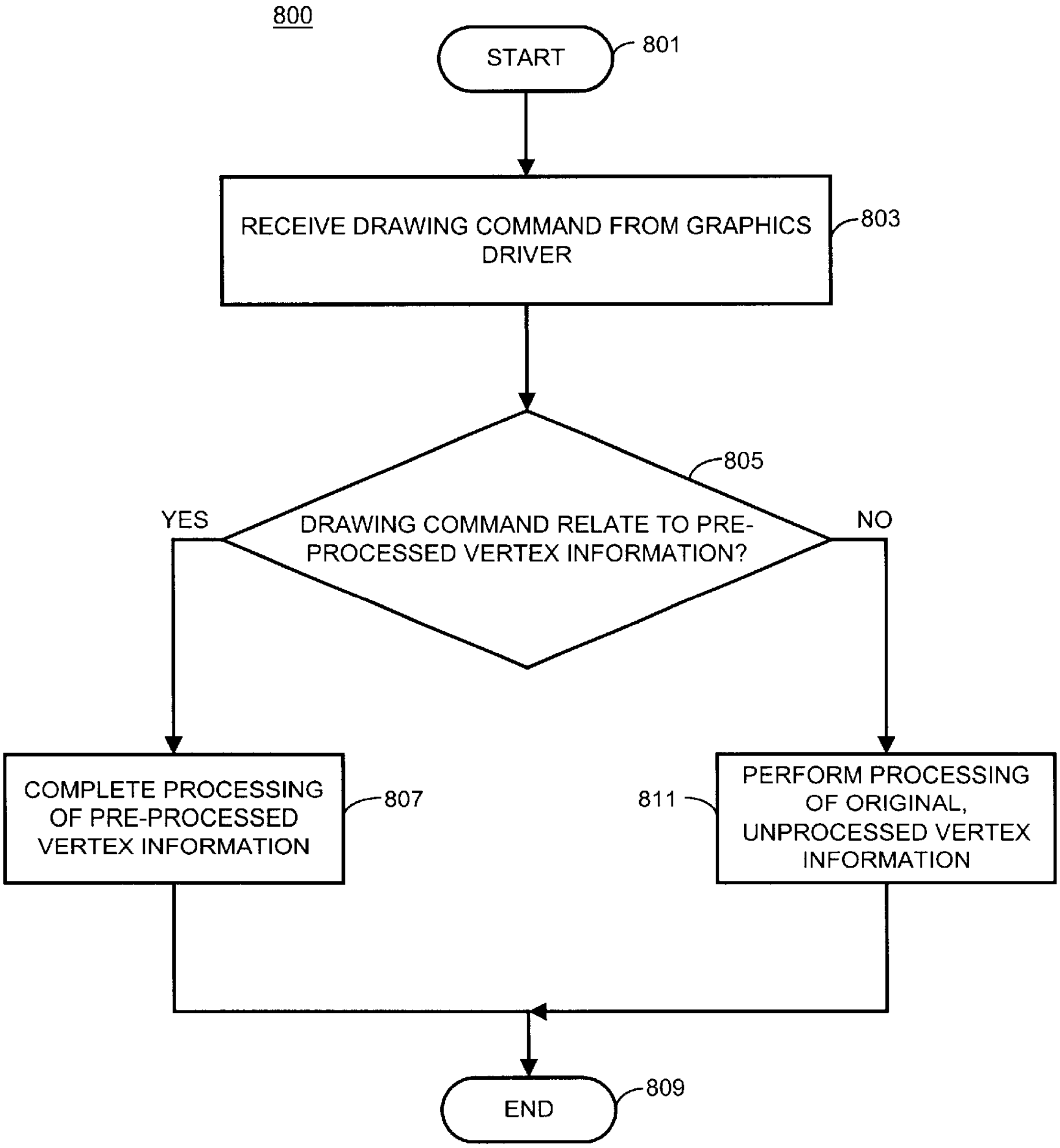
FIG. 8 is a logic flow diagram of steps executed by a graphics processor to improve throughput of a video graphics system in accordance with the present invention.

FIG. 8 is a logic flow diagram 800 of steps executed by a graphics processor to improve throughput of a video graphics system in accordance with the present invention. The steps of the logic flow diagram 800 are preferably implemented in a state machine or microcomputer code that is executed by the graphics processor. The logic flow begins (801) when the graphics processor receives (803) a drawing command from the graphics driver. In a preferred embodiment, the graphics processor receives a fetch instruction and the address of a command buffer containing the drawing command and one or more other drawing commands from the graphics driver. The graphics processor, upon retrieving the drawing command from the command buffer, determines (805) whether the drawing command relates to pre-processed vertex information. Such a determination is preferably made by detecting the presence of a pre-processing indicator within the drawing command. The pre-processing indicator indicates what processing has already been performed by the graphics driver and instructs (either expressly or implicitly by the mere presence of the indicator) the graphics processor not to perform such processing.

When the drawing command received by the graphics processor relates to pre-processed vertex information, the graphics processor completes (807) the vertex information processing of the pre-processed vertex information, and the logic flow ends (809). For example, if the pre-processing indicator indicates that lighting processing has been completed, the graphics processor preferably does not perform any lighting processing, but does perform the remaining vertex information processing (e.g., vertex position transformation processing, clipping processing (if necessary), and rendering for display on a display device the primitives defined by the vertices corresponding to the vertex information). When the drawing command received by the graphics processor does not relate to pre-processed vertex information, the graphics processor performs (811)

all the vertex information processing on the original, unprocessed vertex information in accordance with known techniques, and the logic flow ends (809).

The present invention encompasses a method and apparatus for improving processing throughput of a video graphics system. With this invention, the graphics driver provides vertex parameter processing assistance to the graphics processor at times when the graphics processor is heavily loaded. By pre-processing vertex information when the graphics processor is heavily loaded, the present invention reduces the processing time required by the graphics processor to process vertex information, thereby enabling the video graphics system to maintain a desired throughput even during peak graphics processor processing periods. Without the present invention, the graphics driver and/or the application could become idle while awaiting completion of some vertex buffer processing by the graphics processor, thereby slowing system throughput during peak graphics processor processing periods. By contrast, the present invention transfers some of the processing ordinarily performed by the graphics processor to the graphics driver in an attempt to maintain a more constant throughput during peak graphics processor processing periods, thereby limiting and preferably eliminating any idleness of the graphics driver and/or the application. In order to avoid having the graphics processor ever become idle awaiting drawing commands from the graphics driver, the present invention preferably selects the criteria for off-loading processing onto the graphics driver such that the graphics processor always has a sufficient queue of drawing commands to execute while the graphics driver provides processing assistance.

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

What is claimed is:

1. In a video graphics system that includes a graphics driver, a graphics processor, and a memory, a method for the graphics driver to improve processing throughput of the video graphics system, the method comprising the steps of:

receiving a first drawing command from an application, the first drawing command relating to vertex information stored in the memory of the video graphics system;

determining whether the graphics processor can begin executing the first drawing command within a desired period of time; and partially processing the vertex information in accordance with the first drawing command to produce pre-processed vertex information in the event that the graphics processor cannot begin executing the first drawing command within the desired period of time.

2. The method of claim 1, further comprising the steps of:

storing the pre-processed vertex information in the memory; and providing a second drawing command to the graphics processor, the second drawing command relating to the pre-processed vertex information stored in the memory.

3. The method of claim 2, wherein the second drawing command further instructs the graphics processor not to perform any processing already performed by the graphics driver.

4. The method of claim 3, wherein the second drawing command comprises one of a plurality of drawing commands and wherein the step of providing the second drawing command comprises the steps of:

storing the second drawing command at a location in the memory allocated for storing the plurality of drawing commands; and providing, to the graphics processor, an address of the location in the memory containing the plurality of drawing commands.

5. The method of claim 1, wherein the desired period of time corresponds to a predetermined number of processing cycles of the graphics processor.

6. The method of claim 1, wherein drawing commands are stored in command groups within respective portions of the memory, and wherein the desired period of time corresponds to a threshold number of command groups.

7. The method of claim 1, wherein drawing commands are stored in command groups within respective portions of the memory, wherein at least one command group includes a sufficient quantity of drawing commands to enable the graphics processor to render a video frame of graphics primitives for display on a display device, and wherein the desired period of time corresponds to a threshold number of video frames.

8. The method of claim 7, further comprising the step of:

varying the threshold number of video frames based on a change in a difference between a queued number of video frames and the threshold number of video frames.

9. The method of claim 8, wherein the step of varying the threshold number of video frames comprises the step of:

increasing the threshold number of video frames in the event that the queued number of video frames is decreasing with respect to the threshold number of video frames.

10. The method of claim 8, wherein the step of varying the threshold number of video frames comprises the step of:

decreasing the threshold number of video frames in the event that the queued number of video frames is increasing with respect to the threshold number of video frames.

11. The method of claim 1, wherein the first drawing command comprises one drawing command in a series of drawing commands to be executed by the graphics processor and wherein the step of determining whether the graphics processor can begin executing the first drawing command within a desired period of time comprises the steps of:

reading a completed command code from an associated address of the memory to determine which drawing command in the series of drawing commands was most recently executed by the graphics processor;

determining a quantity of drawing commands remaining to be executed based on which drawing command was most recently executed, the quantity of drawing commands including the first drawing command;

comparing the quantity of drawing commands to a threshold; and determining that the graphics processor cannot begin executing the first drawing command within the desired period of time when the quantity of drawing commands is greater than the threshold.

12. The method of claim 1, wherein the first drawing command comprises one drawing command in a series of drawing commands to be executed by the graphics processor, wherein the series of drawing commands are arranged into groups of drawing commands for storage in the memory, and wherein the step of determining whether the graphics processor can begin executing the first drawing command within a desired period of time comprises the steps of:

reading a completed command code from an associated address of the memory to determine which group of drawing commands was most recently processed by the graphics processor;

determining a quantity of groups of drawing commands remaining to be processed based on which group of drawing commands was most recently processed;

comparing the quantity of groups of drawing commands to a threshold; and determining that the graphics processor cannot begin executing the first drawing command within the desired period of time when the quantity of groups of drawing commands is greater than the threshold.

13. The method of claim 1, wherein the first drawing command comprises one drawing command in a series of drawing commands to be executed by the graphics processor, wherein the series of drawing commands are arranged into groups of drawing commands for storage in the memory, wherein the groups of drawing commands include a sufficient quantity of drawing commands to enable the graphics processor to render at least one video frame of graphics primitives for display on a display device, and wherein the step of determining whether the graphics processor can begin executing the first drawing command within a desired period of time comprises the steps of:

reading a completed command code from an associated address of the memory to determine which group of drawing commands was most recently processed by the graphics processor;

determining a quantity of video frames remaining to be processed based on which group of drawing commands was most recently processed;

comparing the quantity of video frames to a threshold; and determining that the graphics processor cannot begin executing the first drawing command within the desired period of time when the quantity of video frames is greater than the threshold.

14. The method of claim 1, further comprising the steps of:

periodically re-determining whether the graphics processor can begin executing the first drawing command within the desired period of time while partially processing the vertex information;

in the event that the graphics processor can begin executing the first drawing command within the desired period of time and partial processing of the vertex information has not been completed, aborting partial processing of the vertex information.

15. The method of claim 14, further comprising the steps of:

in the event that partial processing of the vertex information was completed, storing the pre-processed vertex information in the memory; and providing a second drawing command to the graphics processor, the second drawing command relating to the pre-processed vertex information stored in the memory; and in the event that partial processing of the vertex information was aborted, providing the first drawing command to the graphics processor.

16. The method of claim 14, wherein the first drawing command comprises one drawing command in a series of drawing commands to be executed by the graphics processor, wherein the series of drawing commands are arranged into groups of drawing commands for storage in the memory, wherein the groups of drawing commands include a sufficient quantity of drawing commands to enable the graphics processor to render at least one video frame of graphics primitives for display on a display device, and wherein the step of periodically re-determining whether the graphics processor can begin executing the first drawing command within the desired period of time comprises the steps of:

reading a completed command code from an associated address of the memory to determine which group of drawing commands was most recently processed by the graphics processor;

determining a quantity of groups of video frames remaining to be processed based on which group of drawing commands was most recently processed;

comparing the quantity of video frames to a threshold; and determining that the graphics processor can begin executing the first drawing command within the desired period of time when the quantity of video frames is less than the threshold.

17. The method of claim 1, wherein the step of partially processing the vertex information comprises the step of performing lighting processing on the vertex information.

18. The method of claim 1, wherein the step of partially processing the vertex information comprises the step of performing vertex position transformation processing on the vertex information.

19. The method of claim 1, wherein the step of partially processing the vertex information comprises the step of performing clipping processing on the vertex information.

20. In a video graphics system that includes a graphics driver, a graphics processor, and a memory, a method for the graphics driver to improve processing throughput of the video graphics system, the method comprising the steps of:

receiving a first drawing command from an application, the first drawing command relating to vertex information stored in the memory;

initially determining whether the graphics processor can begin executing the first drawing command within a desired period of time to produce an initial determination;

at least initiating pre-processing of the vertex information in accordance with the first drawing command to produce pre-processed vertex information in the event that the initial determination indicates that the graphics processor cannot begin executing the first drawing command within the desired period of time;

periodically re-determining whether the graphics processor can begin executing the first drawing command within the desired period of time while pre-processing the vertex information to produce at least one subsequent determination;

in the event that the at least one subsequent determination indicates that the graphics processor can begin executing the first drawing command within the desired period of time and pre-processing of the vertex information has not been completed:

aborting pre-processing of the vertex information; and providing the first drawing command to the graphics processor;

in the event that the at least one subsequent determination indicates that the graphics processor cannot begin executing the first drawing command within the desired period of time and pre-processing of the vertex information has been completed:

storing the pre-processed vertex information in the memory; and providing a second drawing command to the graphics processor, the second drawing command relating to the pre-processed vertex information.

21. The method of claim 20, wherein the first drawing command comprises one drawing command in a series of drawing commands to be executed by the graphics processor, wherein the series of drawing commands are arranged into groups of drawing commands for storage in the memory, wherein the groups of drawing commands include a sufficient quantity of drawing commands to enable the graphics processor to render at least one video frame of graphics primitives for display on a display device, and wherein the step of initially determining whether the graphics processor can begin executing the first drawing command within the desired period of time comprises the steps of:

reading a completed command code from an associated address of the memory to determine which group of drawing commands was most recently processed by the graphics processor;

determining a quantity of video frames remaining to be processed based on which group of drawing commands was most recently processed;

comparing the quantity of video frames to a first threshold; and determining that the graphics processor can begin executing the first drawing command within the desired period of time when the quantity of video frames is less than the first threshold.

22. The method of claim 21, wherein the step of periodically re-determining whether the graphics processor can begin executing the first drawing command within the desired period of time comprises the steps of:

reading the completed command code from the associated address of the memory to determine which group of drawing commands was most recently processed by the graphics processor;

determining a new quantity of video frames remaining to be processed based on which group of drawing commands was most recently processed;

comparing the new quantity of video frames to a second threshold, the second threshold being less than the first threshold; and determining that the graphics processor can begin executing the first drawing command within the desired period of time when the new quantity of video frames is less than the second threshold.

23. In a video graphics system that includes a graphics driver, a graphics processor, and a memory, a method for the graphics processor to improve processing throughput of the video graphics system, the method comprising the steps of:

receiving a first drawing command from the graphics driver to produce a received drawing command in the event that the graphics processor can begin executing the first drawing command within a desired period of time, the first drawing command relating to first vertex information stored in the memory;

receiving a second drawing command from the graphics driver to produce the received drawing command in the event that the graphics processor cannot begin executing the first drawing command within the desired period of time, the second drawing command relating to second vertex information stored in the memory, the second vertex information being partially processed by the graphics driver; and processing one of the first vertex information and the second vertex information in accordance with the received drawing command.

24. The method of claim 23, wherein the second drawing command further instructs the graphics processor not to perform any processing already performed by the graphics driver.

25. The method of claim 23, wherein the step of processing comprises at least one of performing lighting processing, performing vertex position transformation processing, performing clipping processing, and rendering at least one graphics primitive for display on a display device.

26. A storage medium for use in a video graphics system that includes a graphics processor, the storage medium comprising:

first memory including operating instructions that, when executed, cause at least one processing device to perform at least the following functions to improve processing throughput of the video graphics system:

receive a first drawing command from an application, the first drawing command relating to vertex information stored in at least one of the first memory and a second memory;

determine whether the graphics processor can begin executing the first drawing command within a desired period of time; and partially process the vertex information in accordance with the first drawing command to produce pre-processed vertex information in the event that the graphics processor cannot begin executing the first drawing command within the desired period of time.

27. The storage medium of claim 26, wherein the first memory further includes operating instructions that, when executed, cause the at least one processing device to:

store the pre-processed vertex information in at least one of the first memory and the second memory; and provide a second drawing command to the graphics processor, the second drawing command relating to the pre-processed vertex information.

28. The storage medium of claim 26, wherein drawing commands are stored in command groups within respective portions of at least one of the first memory and the second memory, and wherein the desired period of time corresponds to a threshold number of command groups.

29. The storage medium of claim 26, wherein drawing commands are stored in command groups within respective portions of at least one of the first memory and the second memory, wherein at least one command group includes a sufficient quantity of drawing commands to enable the graphics processor to render a video frame of graphics primitives for display on a display device, and wherein the desired period of time corresponds to a threshold number of video frames.

30. The storage medium of claim 29, wherein the first memory further includes operating instructions that, when executed, cause the at least one processing device to:

vary the threshold number of video frames based on a change in a difference between a queued number of video frames and the threshold number of video frames.

31. The storage medium of claim 30, wherein the first memory further includes operating instructions that, when executed, cause the at least one processing device to:

increase the threshold number of video frames in the event that the queued number of video frames is decreasing with respect to the threshold number of video frames.

32. The storage medium of claim 30, wherein the first memory further includes operating instructions that, when executed, cause the at least one processing device to:

decrease the threshold number of video frames in the event that the queued number of video frames is increasing with respect to the threshold number of video frames.

33. The storage medium of claim 26, wherein the first drawing command comprises one drawing command in a series of drawing commands to be executed by the graphics processor and wherein the operating instructions that, when executed, cause the at least one processing device to determine whether the graphics processor can begin executing the first drawing command within a desired period of time include operating instructions to cause the at least one processing device to:

read a completed command code from an associated address of one of the first memory and the second memory to determine which drawing command in the series of drawing commands was most recently executed by the graphics processor;

determine a quantity of drawing commands remaining to be executed based on which drawing command was most recently executed, the quantity of drawing commands including the first drawing command;

compare the quantity of drawing commands to a threshold; and determine that the graphics processor cannot begin executing the first drawing command within the desired period of time when the quantity of drawing commands is greater than the threshold.

34. The storage medium of claim 26, wherein the first drawing command comprises one drawing command in a series of drawing commands to be executed by the graphics processor, wherein the series of drawing commands are arranged into groups of drawing commands for storage in at least one of the first memory and the second memory, and wherein the operating instructions that, when executed, cause the at least one processing device to determine whether the graphics processor can begin executing the first drawing command within a desired period of time include operating instructions to cause the at least one processing device to:

read a completed command code from an associated address of one of the first memory and the second memory to determine which group of drawing commands was most recently processed by the graphics processor;

determine a quantity of groups of drawing commands remaining to be processed based on which group of drawing commands was most recently processed;

compare the quantity of groups of drawing commands to a threshold; and determine that the graphics processor cannot begin executing the first drawing command within the desired period of time when the quantity of groups of drawing commands is greater than the threshold.

35. The storage medium of claim 26, wherein the first drawing command comprises one drawing command in a series of drawing commands to be executed by the graphics processor, wherein the series of drawing commands are arranged into groups of drawing commands for storage in at least one of the first memory and the second memory, wherein the groups of drawing commands include a sufficient quantity of drawing commands to enable the graphics processor to render at least one video frame of graphics primitives for display on a display device, and wherein the operating instructions that, when executed, cause the at least one processing device to determine whether the graphics processor can begin executing the first drawing command within a desired period of time include operating instructions to cause the at least one processing device to:

read a completed command code from an associated address of one of the first memory and the second memory to determine which group of drawing commands was most recently processed by the graphics processor;

determine a quantity of video frames remaining to be processed based on which group of drawing commands was most recently processed;

compare the quantity of video frames to a threshold; and determine that the graphics processor cannot begin executing the first drawing command within the desired period of time when the quantity of video frames is greater than the threshold.

36. The storage medium of claim 26, wherein the first memory further includes operating instructions that, when executed, cause the at least one processing device to:

periodically re-determine whether the graphics processor can begin executing the first drawing command within the desired period of time while partially processing the vertex information;

in the event that the graphics processor can begin executing the first drawing command within the desired period of time and partial processing of the vertex information has not been completed, abort partial processing of the vertex information.

37. The storage medium of claim 36, wherein the first memory further includes operating instructions that, when executed, cause the at least one processing device to:

provide the first drawing command to the graphics processor in the event that the partial processing of the vertex information was aborted.

38. The storage medium of claim 36, wherein the first drawing command comprises one drawing command in a series of drawing commands to be executed by the graphics processor, wherein the series of drawing commands are arranged into groups of drawing commands for storage in at least one of the first memory and the second memory, wherein the groups of drawing commands include a sufficient quantity of drawing commands to enable the graphics processor to render at least one video frame of graphics primitives for display on a display device, and wherein the operating instructions that, when executed, cause the at least one processing device to periodically re-determine whether the graphics processor can begin executing the first drawing command within the desired period of time include operating instructions to cause the at least one processing device to:

read a completed command code from an associated address of one of the first memory and the second memory to determine which group of drawing commands was most recently processed by the graphics processor;

determine a quantity of video frames remaining to be processed based on which group of drawing commands was most recently processed;

compare the quantity of video frames to a threshold; and determine that the graphics processor can begin executing the first drawing command within the desired period of time when the quantity of video frames is less than the threshold.

39. The storage medium of claim 26, wherein the first memory further includes operating instructions that, when executed, cause the at least one processing device to:

instruct the graphics processor not to perform any processing that has already been performed by the at least one processing device.

40. The storage medium of claim 26, wherein the operating instructions that, when executed, cause the at least one processing device to partially process the vertex information include operating instructions to cause the at least one processing device to:

perform at least one of lighting processing, vertex position transformation processing, and clipping processing.

41. The storage medium of claim 26, wherein the storage medium comprises at least one of a random access memory, a read only memory, a floppy disk, a hard drive, a CD-ROM, and a digital versatile disk (DVD).

42. A video graphics system for displaying graphics primitives on a display device responsive to receiving drawing commands from an application, each graphics primitive being defined by at least one vertex, each vertex being characterized by respective vertex information, the video graphics system comprising:

a memory containing vertex information associated with a plurality of vertices defining at least one graphics primitive;

a graphics processor operably coupled to the memory, the graphics processor processing the vertex information in accordance with received drawing commands;

a graphics driver operably coupled to the application, the memory and the graphics processor, the graphics driver configured to:

receive a first drawing command from the application, the first drawing command relating to the vertex information stored in the memory;

determine whether the graphics processor can begin executing the first drawing command within a desired period of time;

provide the first drawing command to the graphics processor in the event that the graphics processor can begin executing the first drawing command within a desired period of time;

partially process the vertex information in accordance with the first drawing command to produce pre-processed vertex information in the event that the graphics processor cannot begin executing the first drawing command within the desired period of time;

store the pre-processed vertex information in the memory; and provide a second drawing command to the graphics processor, the second drawing command relating to the pre-processed vertex information stored in the memory;

wherein the graphics processor is configured to process one of the vertex information and the pre-processed vertex information responsive to receiving a corresponding one of the first drawing command and the second drawing command from the graphics driver.

43. A video graphics system for displaying graphics primitives on a display device, each graphics primitive being defined by at least one vertex, each vertex being characterized by respective vertex information, the video graphics system comprising:

a first memory containing vertex information associated with a plurality of vertices defining at least one graphics primitive;

a first processor operably coupled to the first memory, the first processor processing the vertex information in accordance with received drawing commands;

a second processor operably coupled to the first memory and the first processor, the second processor operating in accordance with operating instructions stored in at least one of the first memory and a second memory, the operating instructions, when executed, causing the second processor to:

generate a first drawing command, the first drawing command relating to the vertex information stored in the memory;

determine whether the first processor can begin executing the first drawing command within a desired period of time;

provide the first drawing command to the first processor in the event that the first processor can begin executing the first drawing command within a desired period of time; and partially process the vertex information in accordance with the first drawing command to produce pre-processed vertex information in the event that the first processor cannot begin executing the first drawing command within the desired period of time;

store the pre-processed vertex information in the memory; and provide a second drawing command to the first processor, the second drawing command relating to the pre-processed vertex information stored in the memory;

wherein the first processor processes one of the vertex information and the pre-processed vertex information responsive to receiving a corresponding one of the first drawing command and the second drawing command from the second processor.

44. The video graphics system of claim 43, wherein the operating instructions, when executed, further cause the second processor to:

periodically re-determine whether the first processor can begin executing the first drawing command within the desired period of time while partially processing the vertex information;

in the event that the first processor can begin executing the first drawing command within the desired period of time and partial processing of the vertex information has not been completed, abort partial processing of the vertex information.

45. The video graphics system of claim 44, wherein the operating instructions, when executed, further cause the second processor to:

provide the first drawing command to the first processor in the event that the partial processing of the vertex information was aborted.

46. The video graphics system of claim 43, wherein the first drawing command comprises one drawing command in a series of drawing commands to be executed by the first processor, wherein the series of drawing commands are arranged into groups of drawing commands for storage in at least one of the first memory and the second memory, wherein the groups of drawing commands include a sufficient quantity of drawing commands to enable the first processor to render at least one video frame of graphics primitives for display on the display device, and wherein the operating instructions that, when executed, cause the second processor to determine whether the graphics processor can begin executing the first drawing command within a desired period of time include operating instructions to cause the second processor to:

read a completed command code from an associated address of one of the first memory and the second memory to determine which group of drawing commands was most recently processed by the first processor;

determine a quantity of video frames remaining to be processed based on which group of drawing commands was most recently processed;

compare the quantity of video frames to a threshold; and determine that the first processor cannot begin executing the first drawing command within the desired period of time when the quantity of video frames is greater than the threshold.

* * * * *